United States Patent
Zhang (10) Patent No.: US 11,985,630 B2
(45) Date of Patent: May 14, 2024

(54) METHODS, APPARATUS AND SYSTEMS FOR REDUCING ACCESS DELAY IN A WIRELESS COMMUNICATION

(71) Applicant: ZTE CORPORATION, Guangdong (CN)

(72) Inventor: Li Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 389 days.

(21) Appl. No.: 17/353,327

(22) Filed: Jun. 21, 2021

(65) Prior Publication Data
US 2021/0329599 A1    Oct. 21, 2021

Related U.S. Application Data

(63) Continuation of application No. PCT/CN2018/124704, filed on Dec. 28, 2018.

(51) Int. Cl.
*H04W 72/02* (2009.01)
*H04W 24/08* (2009.01)
*H04W 72/0453* (2023.01)
*H04W 72/542* (2023.01)
*H04W 74/0816* (2024.01)

(52) U.S. Cl.
CPC .......... *H04W 72/02* (2013.01); *H04W 24/08* (2013.01); *H04W 72/0453* (2013.01); *H04W 72/542* (2023.01); *H04W 74/0816* (2013.01)

(58) Field of Classification Search
CPC ..... H04W 72/02; H04W 72/04; H04W 24/08; H04W 72/0453; H04W 72/542; H04W 74/0816; H04W 74/0833; H04W 74/004; H04W 74/006; H04L 5/001; H04L 5/0094
See application file for complete search history.

(56) References Cited

U.S. PATENT DOCUMENTS

| | | | |
|---|---|---|---|
| 2018/0302863 A1* | 10/2018 | Petersson | H04W 72/54 |
| 2018/0324864 A1 | 11/2018 | Jung et al. | |
| 2018/0324869 A1* | 11/2018 | Phuyal | H04W 74/0833 |
| 2019/0364451 A1* | 11/2019 | Yang | H04W 24/10 |

(Continued)

FOREIGN PATENT DOCUMENTS

| | | |
|---|---|---|
| CN | 106993335 A | 7/2017 |
| KR | 10-2017-0134398 A | 12/2017 |

(Continued)

OTHER PUBLICATIONS

Extended European Search Report for EP Appl. No. 18929956.3, dated Dec. 14, 2021 (9 pages).

(Continued)

*Primary Examiner* — Mohamed A Kamara
(74) *Attorney, Agent, or Firm* — Foley & Lardner LLP (57) ABSTRACT

Methods, apparatus and systems for reducing access delay in a wireless communication are disclosed. In one embodiment, a method performed by a wireless communication node is disclosed. The method comprises: configuring a plurality of transmission resources for an access of a wireless communication device to the wireless communication node; and receiving, from the wireless communication device on a first transmission resource among the plurality of transmission resources, a first message comprising a preamble for the access to the wireless communication node.

19 Claims, 6 Drawing Sheets

(56) References Cited

U.S. PATENT DOCUMENTS

| | | | | |
|---|---|---|---|---|
| 2019/0364602 A1* | 11/2019 | Yi | ................... | H04W 74/0833 |
| 2020/0128455 A1* | 4/2020 | Da Silva | ............. | H04W 74/004 |
| 2021/0007147 A1* | 1/2021 | Yang | ................... | H04W 56/001 |
| 2021/0289536 A1* | 9/2021 | Liu | ................... | H04W 74/0841 |

FOREIGN PATENT DOCUMENTS

| | | |
|---|---|---|
| KR | 10-2018-0109962 A | 10/2018 |
| KR | 10-2018-0116313 A | 10/2018 |
| WO | WO-2013/116998 A1 | 8/2013 |
| WO | WO-2017/136458 A2 | 8/2017 |
| WO | WO-2017/136458 A3 | 9/2017 |
| WO | WO-2018/203727 A1 | 11/2018 |

OTHER PUBLICATIONS

International Search Report and Written Opinion for PCT Appl. No. PCT/CN2018/124704 dated Sep. 18, 2019 (6 pages).
Samsung: "Rach procedure considering flexible UE bandwidth" 3GPP TSG RAN WG1 Meeting #86bis; R1-1609116; Oct. 14, 2016; Lisbon, Portugal (3 pages).
Office Action for KR App. No. 10-2021-7023929 dated Dec. 4, 2023 (partial English translation, 8 pages).

* cited by examiner

METHODS, APPARATUS AND SYSTEMS FOR REDUCING ACCESS DELAY IN A WIRELESS COMMUNICATION

CROSS REFERENCE TO RELATED APPLICATION

This application claims the benefit of priority under 35 U.S.C. § 120 as a continuation of PCT Patent Application No. PCT/CN2018/124704, filed on Dec. 28, 2018, the disclosure of which is incorporated herein by reference in its entirety.

TECHNICAL FIELD

The disclosure relates generally to wireless communications and, more particularly, to methods, apparatus and systems for reducing access delay in a wireless communication.

BACKGROUND

In both the 4th Generation (4G) and the 5th Generation (5G) new radio (NR) mobile networks, before a user equipment (UE) sends data to a base station (BS), the UE needs to obtain uplink synchronization and downlink synchronization with the BS. The uplink timing synchronization may be achieved by performing a random access procedure.

In an unlicensed spectrum, the UE performs a listen-before-talk (LBT) with a clear channel assessment (CCA) check before transmitting data. The CCA utilizes at least energy detection to determine presence or absence of other signals on the channel in order to determine if the channel is occupied or clear, respectively. When the channel is occupied, the UE needs to wait for a while to perform the next LBT. When the channel is clear, the UE can transmit data. Due to the opportunistic occupation characteristic, the UE may not transmit timely, may not transmit for a while, or may even have no chance to transmit, which will at least increase access delay and impact the system performance.

Thus, existing systems and methods for performing a random access in a wireless communication are not entirely satisfactory.

SUMMARY

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a wireless communication node is disclosed. The method comprises: configuring a plurality of transmission resources for an access of a wireless communication device to the wireless communication node; and receiving, from the wireless communication device on a first transmission resource among the plurality of transmission resources, a first message comprising a preamble for the access to the wireless communication node.

In another embodiment, a method performed by a wireless communication device is disclosed. The method comprises: obtaining a first transmission resource among a plurality of transmission resources configured for an access of the wireless communication device to a wireless communication node; and transmitting, to the wireless communication node on the first transmission resource, a first message comprising a preamble for the access to the wireless communication node.

In a different embodiment, a wireless communication node configured to carry out a disclosed method in some embodiment is disclosed. In another embodiment, a wireless communication device configured to carry out a disclosed method in some embodiment is disclosed. In yet another embodiment, a non-transitory computer-readable medium having stored thereon computer-executable instructions for carrying out a disclosed method in some embodiment is disclosed.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

A typical wireless communication network includes one or more base stations (typically known as a "BS") that each provides geographical radio coverage, and one or more wireless user equipment devices (typically known as a "UE") that can transmit and receive data within the radio coverage. In the wireless communication network, a BS and a UE can communicate with each other via a communication link, e.g., via a downlink radio frame from the BS to the UE or via an uplink radio frame from the UE to the BS.

A terminal or UE completes an access to a BS by a random access channel (RACH) procedure. The present teaching discloses some enhancements for the RACH procedure to reduce the access delay of the UE as much as possible, e.g. by reducing steps for the RACH procedure, and/or providing multiple transmission opportunities for each message of the RACH procedure.

In one embodiment, when multiple RACH resources are configured in multiple transmission resources or frequency bands, the UE may select a transmission resource to transmit the preamble during the RACH process. Each transmission resource may be a carrier, a bandwidth part (BWP) or a frequency sub-band. In one example, the UE may select a transmission resource based on some measurement results and a threshold. In one example, a transmission resource is selected by the BS, and then configured to the UE via remaining minimum system information (RMSI) or a radio resource control (RRC) message. In one embodiment, when the transmission resource used for transmitting preamble changes during RACH procedure, the power ramping counter is not incremented.

In one embodiment, when multiple transmission resources are configured during the RACH procedure, the UE needs to know which transmission resource is used to transmit Message (Msg) 2 and Msg 4 during the RACH procedure, such that the UE can know the configuration of which transmission resource will be used. In one example, the transmission resource used for transmitting Msg 2 and/or Msg 4 is configured to the UE by the BS. In another example, the transmission resource used for transmitting Msg 2 and/or Msg 4 is pre-determined. For example, Msg 2 may be transmitted on a same carrier, BWP or sub-band as the Msg 1 (preamble) transmission.

In one embodiment, when multiple transmission resources are configured during the RACH procedure, index or identification information for the selected transmission resource is indicated for handover process or physical downlink control channel (PDCCH) order. For handover, when multiple BWP or sub-band RACH resources are indicated to the UE, there may be a case that a contention-based random access (CBRA) procedure is initiated in some BWP or sub-bands, while a contention free random access (CFRA) procedure is initiated in other BWP or sub-bands. In this case, resources of one or more procedures may be indicated to the physical layer. For example, only resources for initializing the CFRA procedure are indicated to the physical layer.

When multiple transmission resources are configured during the RACH procedure, the present teaching discloses different methods to configure the transmission resources. In one example, a common RACH configuration may be configured to the UE for all of the multiple transmission resources. In another example, some RACH parameters including frequency domain resource are configured to the UE in each transmission resource, while other RACH parameters are common for all transmission resources.

When multiple sub-bands with RACH resources are configured to the UE, if multiple UEs transmit the same preamble with the same PRACH resource, it will cause a collision. In order to avoid the collision, a sub-band index is introduced into the random access radio network temporary identifier (RA-RNTI) formula. For multiple preamble transmissions, the present teaching discloses different methods for the selection of multiple preambles and physical random access channel (PRACH) resources. In one method, when a SS/PBCH block (synchronization signal/physical broadcast channel block, abbreviated as SSB) is selected, PRACH occasions associated with the SSB may be selected. If the number of PRACH occasions reaches a predefined number N1, the front N1 PRACH occasions are selected, or N1 PRACH occasions are selected randomly. If the number of PRACH occasions does not reach N1, the continuous PRACH occasions after the last PRACH occasion associated with the selected SSB may be selected as multiple PRACH occasions for transmitting the preamble. In another method, PRACH occasions are grouped. The PRACH occasions within a group are associated with a SSB. Once a SSB is selected, PRACH occasions within the group are all selected for the multiple preamble transmissions.

In various embodiments, a BS may be referred to as a network side node and can include, or be implemented as, a next Generation Node B (gNB), an E-UTRAN Node B (eNB), a Transmission Reception Point (TRP), an Access Point (AP), a donor node (DN), a relay node, a core network (CN) node, a RAN node, a master node, a secondary node, a distributed unit (DU), a centralized unit (CU), etc. A UE in the present disclosure can be referred to as a terminal and can include, or be implemented as, a mobile station (MS), a station (STA), etc. A BS and a UE may be described herein as non-limiting examples of "wireless communication nodes;" and a UE may be described herein as non-limiting examples of "wireless communication devices." The BS and UE can practice the methods disclosed herein and may be capable of wireless and/or wired communications, in accordance with various embodiments of the present disclosure.

Figure 1:
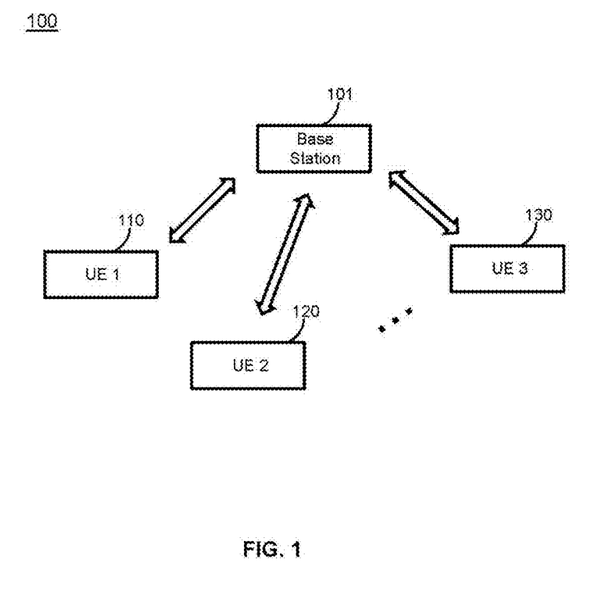
FIG. 1 illustrates an exemplary communication network in which techniques disclosed herein may be implemented, in accordance with an embodiment of the present disclosure.

FIG. 1 illustrates an exemplary communication network 100 in which techniques disclosed herein may be implemented, in accordance with an embodiment of the present disclosure. As shown in FIG. 1, the exemplary communication network 100 includes a base station (BS) 101 and a plurality of UEs, UE 1 110, UE 2 120 . . . UE 3 130, where the BS 101 can communicate with the UEs according to wireless protocols. The BS 101 and a UE, e.g. UE 1 110, may communicate with each other either under a licensed spectrum or under an unlicensed spectrum. In some countries and regions, there are corresponding regulatory policies for the use of unlicensed spectrum. For example, a UE must perform listen before talk (LBT), also known as Clear Channel Assessment (CCA), before sending data using an unlicensed carrier. As such, only LBT-enabled devices or UEs can send data on the unlicensed carrier.

Figure 2:
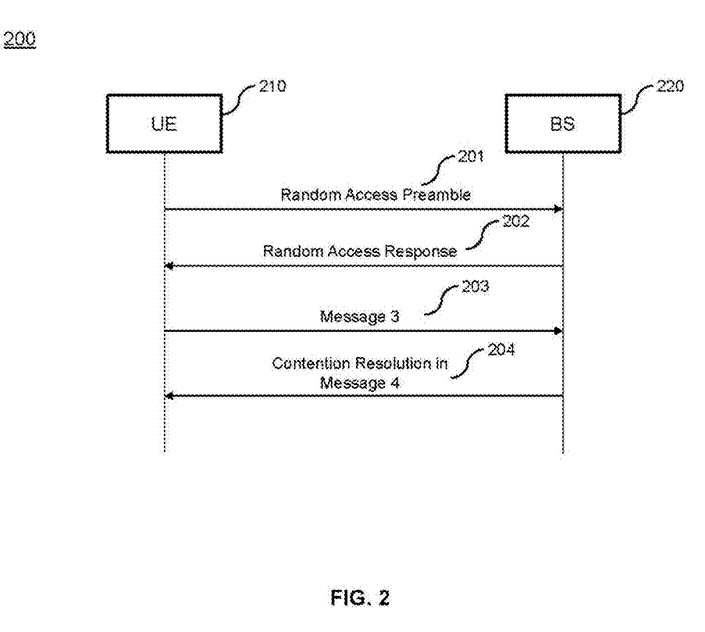
FIG. 2 illustrates an exemplary random access procedure, in accordance with some embodiments of the present disclosure.

FIG. 2 illustrates an exemplary 4-step random access procedure 200, in accordance with some embodiments of the present disclosure. As shown in FIG. 2, a UE 210 transmits a random access channel (RACH) preamble in Message 1 to a BS 220 at operation 201. Once the preamble is received successfully by the BS 220, the BS 220 will send at operation 202 a Message 2 back to the UE 210, in which a medium access control (MAC) random access response (RAR) is included as a response to the preamble. Once the MAC RAR with corresponding random access preamble (RAP) identifier (ID) is received, the UE 210 transmits Message 3 at operation 203 to the BS 220 with the grant carried in the MAC RAR. Once the Message 3 is received, the BS 220 will send the Message 4 back at operation 204 to the UE 210, in which some kind of contention resolution ID will be included for the purpose of contention resolution. On the other hand, for unlicensed spectrum, if LBT is performed before each transmission, each of the four messages for the RACH procedure may not be transmitted timely, which will increase access delay and impact the system performance.

Figure 3:
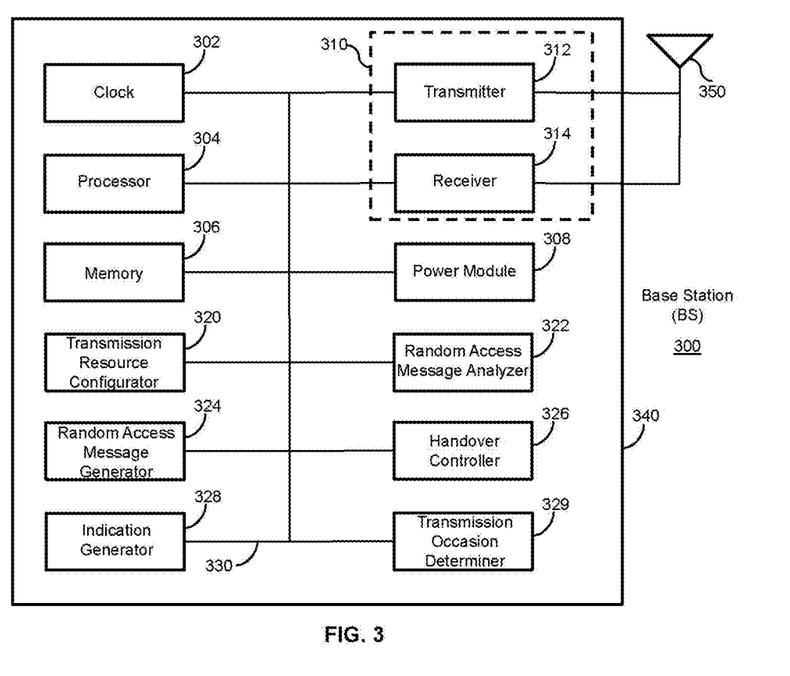
FIG. 3 illustrates a block diagram of a base station (BS), in accordance with some embodiments of the present disclosure.

FIG. 3 illustrates a block diagram of a base station (BS) 300, in accordance with some embodiments of the present disclosure. The BS 300 is an example of a node that can be configured to implement the various methods described herein. As shown in FIG. 3, the BS 300 includes a housing 340 containing a system clock 302, a processor 304, a memory 306, a transceiver 310 comprising a transmitter 312 and receiver 314, a power module 308, a transmission resource configurator 320, a random access message analyzer 322, a random access message generator 324, a handover controller 326, an indication generator 328, a transmission occasion determiner 329.

In this embodiment, the system clock 302 provides the timing signals to the processor 304 for controlling the timing of all operations of the BS 300. The processor 304 controls the general operation of the BS 300 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 306, which can include both read-only memory (ROM) and random access memory (RAM), can provide instructions and data to the processor 304. A portion of the memory 306 can also include non-volatile random access memory (NVRAM). The processor 304 typically performs logical and arithmetic operations based on program instructions stored within the memory 306. The instructions (a.k.a., software) stored in the memory 306 can be executed by the processor 304 to perform the methods described herein. The processor 304 and memory 306 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 310, which includes the transmitter 312 and receiver 314, allows the BS 300 to transmit and receive data to and from a remote device (e.g., another BS or a UE). An antenna 350 is typically attached to the housing 340 and electrically coupled to the transceiver 310. In various embodiments, the BS 300 includes (not shown) multiple transmitters, multiple receivers, and multiple transceivers. In one embodiment, the antenna 350 is replaced with a multi-antenna array 350 that can form a plurality of beams each of which points in a distinct direction. The transmitter 312 can be configured to wirelessly transmit packets having different packet types or functions, such packets being generated by the processor 304. Similarly, the receiver 314 is configured to receive packets having different packet types or functions, and the processor 304 is configured to process packets of a plurality of different packet types. For example, the processor 304 can be configured to determine the type of packet and to process the packet and/or fields of the packet accordingly.

In a communication system including the BS 300 that can serve one or more UEs, the BS 300 may receive a random access request from a UE for access to the BS 300. In one embodiment, the transmission resource configurator 320 may configure a plurality of transmission resources for an access of the UE to the BS 300. In one embodiment, each of the plurality of transmission resources is at least one of: a carrier, a bandwidth part (BWP) and a frequency sub-band. The access may be associated with at least one of: a handover process; an uplink synchronization process; and a beam failure recovery process.

The random access message analyzer 322 in this example may receive and analyze, via the receiver 314 from the UE on a first transmission resource among the plurality of transmission resources, a first message comprising a preamble for the access to the BS 300. The first message may comprise information related to a radio network temporary identifier (RNTI) for the UE to identify a response to the first message. The RNTI may be associated with an indication of the first transmission resource, e.g. by an index of a frequency sub-band.

In one example, the first transmission resource is selected by the UE from the plurality of transmission resources. In another example, the transmission resource configurator 320 can select the first transmission resource from the plurality of transmission resources; and configure the first transmission resource to the wireless communication device. The first transmission resource may be selected from the plurality of transmission resources based on measurement results corresponding to the plurality of transmission resources and a threshold. The measurement results may be related to at least one of: reference signal received power (RSRP), received signal strength indication (RSSI), and channel occupancy rate. A measurement result corresponding to the first transmission resource is at least one of: a sole one of the measurement results that is greater than the threshold, a random one of multiple measurement results among the measurement results that are greater than the threshold, and a random one of the measurement results that are not greater than the threshold.

In one embodiment, each of the plurality of transmission resources is a frequency sub-band; and common parameters related to the access to the BS 300 are configured to the UE for each frequency sub-band. In another embodiment, each of the plurality of transmission resources is a frequency sub-band; at least one parameter including a frequency domain resource is configured separately for each frequency sub-band; and parameters other than the at least one parameter are commonly configured to the wireless communication device for each frequency sub-band.

In one embodiment, the transmission resource configurator 320 may select a second transmission resource from the plurality of transmission resources based on at least one of:

the first transmission resource according to a predetermined protocol and statistics related to the plurality of transmission resources; and configure the second transmission resource to the UE for monitoring a second message. The random access message generator 324 in this example may generate and transmit, via the transmitter 312 to the UE, the second message in response to the first message on the second transmission resource.

In another embodiment, the random access message generator 324 may generate and transmit, via the transmitter 312 to the UE, a second message in response to the first message. The second message indicates a failure of the access of the UE to the BS 300. In this case, the random access message analyzer 322 may receive again, via the receiver 314 from the UE on a second transmission resource that is different from the first transmission resource, the first message comprising the preamble for the access to the BS 300. The first message is transmitted by the UE on the first and second transmission resources with a same transmission power.

The handover controller 326 in this example may control a handover of the UE. For example, the handover controller 326 may receive, from a target BS, an indication indicating at least one transmission resource. The indication generator 328 may forward the indication to the UE. One of the at least one transmission resource may be utilized for an access of the UE to the target BS based on a handover process. In one embodiment, the indication generator 328 may generate and transmit, via the transmitter 312, an indication associated with the first transmission resource to the UE. The indication can indicate at least one of: a bandwidth part (BWP) and a frequency sub-band.

The transmission occasion determiner 329 in this example can determine one or more transmission occasions for the UE to transmit a preamble for the access to the BS 300. In one embodiment, the transmission occasion determiner 329 selects a synchronization signal block (SSB) from a plurality of SSBs based on measurement results corresponding to the plurality of SSBs and a threshold; and identifies a predetermined number (N) of occasions each of which is utilized by the UE to transmit a preamble for the access to the BS 300. The occasions are identified based on at least one of: front N occasions among a plurality of occasions associated with the selected SSB, randomly selected N occasions among the plurality of occasions associated with the selected SSB, and at least one continuous occasion after last occasion associated with the selected SSB. The transmission occasion determiner 329 may configure the N occasions to the UE based on at least one of: one indication indicating information related to all of the N occasions, and N indications each of which indicates information related to one of the N occasions before the occasion.

In another embodiment, the transmission occasion determiner 329 selects a synchronization signal block (SSB) from a plurality of SSBs based on measurement results corresponding to the plurality of SSBs and a threshold. Each of the plurality of SSBs corresponds to a random access period. The transmission occasion determiner 329 may identify a group of occasions within a random access period corresponding to the selected SSB. Each of the occasions is utilized by the UE to transmit a preamble for the access to the BS 300. The transmission occasion determiner 329 may configure the group of occasions to the UE based on at least one of: one indication indicating information related to the group of occasions, and multiple indications each of which indicates information related to one of the group of occasions before the occasion.

As used herein, the term "layer" refers to an abstraction layer of a layered model, e.g. the open systems interconnection (OSI) model, which partitions a communication system into abstraction layers. A layer serves the next higher layer above it, and is served by the next lower layer below it.

The power module 308 can include a power source such as one or more batteries, and a power regulator, to provide regulated power to each of the above-described modules in FIG. 3. In some embodiments, if the BS 300 is coupled to a dedicated external power source (e.g., a wall electrical outlet), the power module 308 can include a transformer and a power regulator.

The various modules discussed above are coupled together by a bus system 330. The bus system 330 can include a data bus and, for example, a power bus, a control signal bus, and/or a status signal bus in addition to the data bus. It is understood that the modules of the BS 300 can be operatively coupled to one another using any suitable techniques and mediums.

Although a number of separate modules or components are illustrated in FIG. 3, persons of ordinary skill in the art will understand that one or more of the modules can be combined or commonly implemented. For example, the processor 304 can implement not only the functionality described above with respect to the processor 304, but also implement the functionality described above with respect to the transmission resource configurator 320. Conversely, each of the modules illustrated in FIG. 3 can be implemented using a plurality of separate components or elements.

Figure 4:
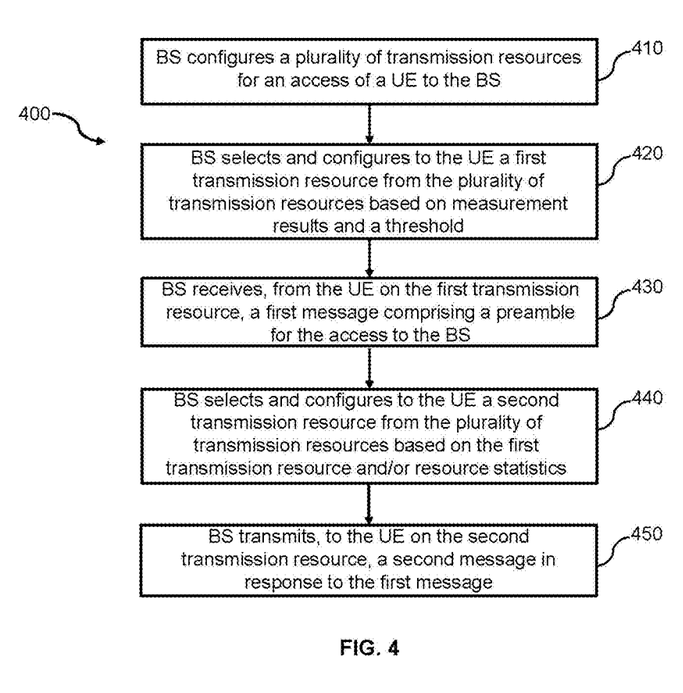
FIG. 4 illustrates a flow chart for a method performed by a BS for reducing access delay, in accordance with some embodiments of the present disclosure.

FIG. 4 illustrates a flow chart for a method 400 performed by a BS, e.g. the BS 300 in FIG. 3, for reducing access delay, in accordance with some embodiments of the present disclosure. At operation 410, the BS configures a plurality of transmission resources for an access of a UE to the BS. At operation 420, the BS selects and configures to the UE a first transmission resource from the plurality of transmission resources based on measurement results and a threshold. At operation 430, the BS receives, from the UE on the first transmission resource, a first message comprising a preamble for the access to the BS. At operation 440, the BS selects and configures to the UE a second transmission resource from the plurality of transmission resources based on the first transmission resource and/or resource statistics. At operation 450, the BS transmits, to the UE on the second transmission resource, a second message in response to the first message.

Figure 5:
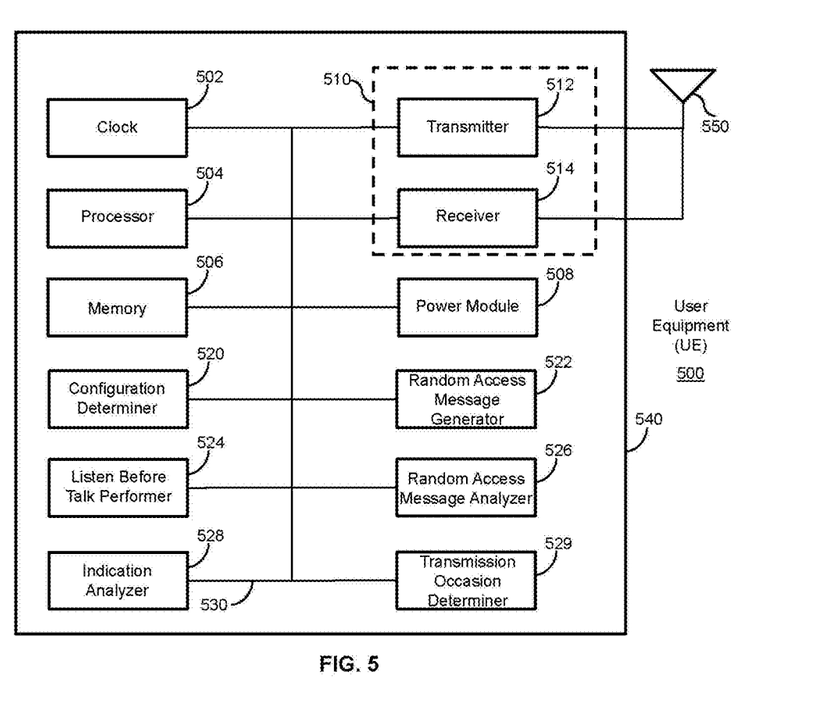
FIG. 5 illustrates a block diagram of a user equipment (UE), in accordance with some embodiments of the present disclosure.

FIG. 5 illustrates a block diagram of a user equipment (UE) 500, in accordance with some embodiments of the present disclosure. The UE 500 is an example of a device that can be configured to implement the various methods described herein. As shown in FIG. 5, the UE 500 includes a housing 540 containing a system clock 502, a processor 504, a memory 506, a transceiver 510 comprising a transmitter 512 and a receiver 514, a power module 508, a configuration determiner 520, a random access message generator 522, a listen before talk (LBT) performer 524, a random access message analyzer 526, an indication analyzer 528, and a transmission occasion determiner 529.

In this embodiment, the system clock 502, the processor 504, the memory 506, the transceiver 510 and the power module 508 work similarly to the system clock 302, the processor 304, the memory 306, the transceiver 310 and the power module 308 in the BS 300. An antenna 550 or a multi-antenna array 550 is typically attached to the housing 440 and electrically coupled to the transceiver 510.

In a communication system, the UE 500 may want to access a BS for data transfer. For an access of the UE 500 to the BS, the configuration determiner 520 in this example obtains a first transmission resource among a plurality of transmission resources configured for the access. The access may be associated with at least one of: a handover process; an uplink synchronization process; and a beam failure recovery process.

In one embodiment, each of the plurality of transmission resources is at least one of: a carrier, a bandwidth part (BWP) and a frequency sub-band. The first transmission resource may be selected by the UE 500 and/or the BS. The first transmission resource may be selected from the plurality of transmission resources based on measurement results corresponding to the plurality of transmission resources and a threshold. The measurement results may be related to at least one of: reference signal received power (RSRP), received signal strength indication (RSSI), and channel occupancy rate. A measurement result corresponding to the first transmission resource may be at least one of: a sole one of the measurement results that is greater than the threshold, a random one of multiple measurement results among the measurement results that are greater than the threshold, and a random one of the measurement results that are not greater than the threshold.

In one embodiment, each of the plurality of transmission resources is a frequency sub-band; and common parameters related to the access to the BS are configured to the UE 500 for each frequency sub-band. In another embodiment, each of the plurality of transmission resources is a frequency sub-band; at least one parameter including a frequency domain resource is configured separately for each frequency sub-band; and parameters other than the at least one parameter are commonly configured to the UE 500 for each frequency sub-band.

The random access message generator 522 in this example generates and transmits, to the BS on the first transmission resource, a first message comprising a preamble for the access to the BS. The first message may comprise information related to a radio network temporary identifier (RNTI) for the UE 500 to identify a response to the first message. The RNTI may be associated with an indication of the first transmission resource, which may be an index of a frequency sub-band.

In one embodiment, the LBT performer 524 performs a listen-before-talk (LBT) process on each of the plurality of transmission resources in turn and sends the results to the configuration determiner 520. The configuration determiner 520 may determine the first transmission resource in response to a successful LBT on the first transmission resource; and determine at least one configuration parameter related to the first transmission resource.

In one embodiment, each of the plurality of transmission resources is configured for a contention based random access (CBRA) or a contention free random access (CFRA) based on a measurement result associated with the transmission resource and a threshold. When at least one transmission resource, among the plurality of transmission resources, is configured for CFRA, the LBT performer 524 performs a LBT process on each of the at least one transmission resource in turn, and sends the results to the configuration determiner 520. The configuration determiner 520 may determine the first transmission resource in response to a successful LBT on the first transmission resource, and determine at least one configuration parameter related to the first transmission resource. When all of the plurality of transmission resources are configured for CBRA, the LBT performer 524 performs a LBT process on each of the plurality of transmission resources in turn, and sends the results to the configuration determiner 520. The configuration determiner 520 may determine the first transmission resource in response to a successful LBT on the first transmission resource, and determine at least one configuration parameter related to the first transmission resource.

The random access message analyzer 526 in this example may receive and analyze, via the receiver 514 from the BS, a second message in response to the first message. The second message indicates a failure of the access of the UE 500 to the BS. The random access message generator 522 may generate and transmit again, via the transmitter 512 to the BS on a second transmission resource that is different from the first transmission resource, the first message comprising the preamble for the access to the BS. The first message is transmitted on the first and second transmission resources with a same transmission power.

In one embodiment, the configuration determiner 520 determines a second transmission resource from the plurality of transmission resources based on at least one of: the first transmission resource according to a predetermined protocol, and a configuration from the wireless communication node based on statistics related to the plurality of transmission resources. The configuration determiner 520 may inform the determined second transmission resource to the random access message analyzer 526. The random access message analyzer 526 may then receive and analyze, via the receiver 514 from the BS, a second message in response to the first message on the second transmission resource.

The indication analyzer 528 in this example receives and analyzes, via the receiver 514 from the BS, an indication indicating at least one transmission resource. The configuration determiner 520 may then select one of the at least one transmission resource for an access of the UE 500 to an additional BS (a target BS) based on a handover process. In one embodiment, the indication analyzer 528 may receive and analyze, via the receiver 514 from the BS, an indication associated with the first transmission resource. The indication indicates at least one of: a bandwidth part (BWP) and a frequency sub-band.

The transmission occasion determiner 529 in this example can determine one or more transmission occasions for the UE 500 to transmit a preamble for the access to the BS. In one embodiment, the transmission occasion determiner 529 selects a synchronization signal block (SSB) from a plurality of SSBs based on measurement results corresponding to the plurality of SSBs and a threshold; and identifies a predetermined number (N) of occasions each of which is utilized by the UE 500 to transmit a preamble for the access to the BS. The occasions are identified based on at least one of: front N occasions among a plurality of occasions associated with the selected SSB, randomly selected N occasions among the plurality of occasions associated with the selected SSB, and at least one continuous occasion after last occasion associated with the selected SSB. The transmission occasion determiner 529 may configure the N occasions to a physical layer of the UE 500 based on at least one of: one indication indicating information related to all of the N occasions, and N indications each of which indicates information related to one of the N occasions before the occasion.

In another embodiment, the transmission occasion determiner 529 selects a SSB from a plurality of SSBs based on measurement results corresponding to the plurality of SSBs and a threshold. Each of the plurality of SSBs corresponds to a random access period. The transmission occasion determiner 529 may identify a group of occasions within a random access period corresponding to the selected SSB. Each of the occasions is utilized by the UE 500 to transmit a preamble for the access to the BS. The transmission occasion determiner 529 may configure the group of occasions to a physical layer of the UE based on at least one of: one indication indicating information related to the group of occasions, and multiple indications each of which indicates information related to one of the group of occasions before the occasion.

The various modules discussed above are coupled together by a bus system 530. The bus system 530 can include a data bus and, for example, a power bus, a control signal bus, and/or a status signal bus in addition to the data bus. It is understood that the modules of the UE 500 can be operatively coupled to one another using any suitable techniques and mediums.

Although a number of separate modules or components are illustrated in FIG. 5, persons of ordinary skill in the art will understand that one or more of the modules can be combined or commonly implemented. For example, the processor 504 can implement not only the functionality described above with respect to the processor 504, but also implement the functionality described above with respect to the configuration determiner 520. Conversely, each of the modules illustrated in FIG. 5 can be implemented using a plurality of separate components or elements.

Figure 6:
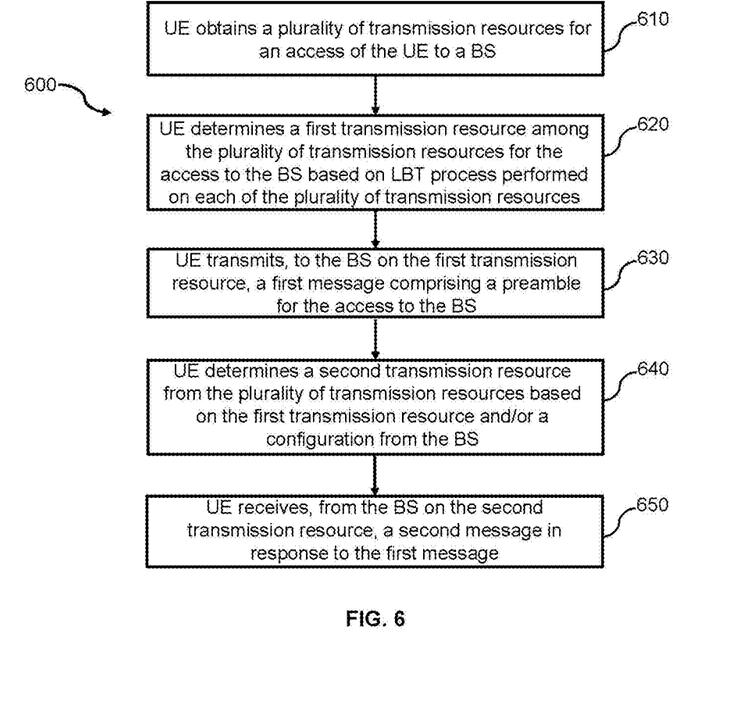
FIG. 6 illustrates a flow chart for a method performed by a UE for reducing access delay, in accordance with some embodiments of the present disclosure.

FIG. 6 illustrates a flow chart for a method 600 performed by a UE, e.g. the UE 500 in FIG. 5, for reducing access delay, in accordance with some embodiments of the present disclosure. At operation 610, the UE obtains a plurality of transmission resources for an access of the UE to a BS. At operation 620, the UE determines a first transmission resource among the plurality of transmission resources for the access to the BS based on LBT process performed on each of the plurality of transmission resources. At operation 630, the UE transmits, to the BS on the first transmission resource, a first message comprising a preamble for the access to the BS. At operation 640, the UE determines a second transmission resource from the plurality of transmission resources based on the first transmission resource and/or a configuration from the BS. At operation 650, the UE receives, from the BS on the second transmission resource, a second message in response to the first message.

Different embodiments of the present disclosure will now be described in detail hereinafter. It is noted that the features of the embodiments and examples in the present disclosure may be combined with each other in any manner without conflict.

In a first embodiment, when multiple transmission resources, e.g. multiple carriers, BWPs, and/or sub-bands are configured to a UE, each BWP or sub-band may be configured as a RACH resource. When multiple BWPs or sub-bands are configured as RACH resource and RACH procedure is triggered, how to select a BWP or sub-band is proposed in this embodiment. For example, a threshold is configured to the UE such that the UE selects a BWP or sub-band based on some measurement results (such as RSRP, RSSI, and channel occupancy rate) and the threshold. When there is a BWP or sub-band whose measurement result exceeds the threshold, the BWP or sub-band will be selected. When there are some BWPs or sub-bands whose measurement results exceed the threshold, a BWP or sub-band exceeding the threshold may be selected. Alternatively, any BWP or sub-band may be selected.

The selection threshold for the BWP or sub-band may be configured via SIB1 or RRC message (such as RRC reconfiguration, RRC setup, and RRC resume). Taking multiple BWP configurations for example, a BWP selection threshold may be added in the ServingCellConfigCommon message of a protocol; and a BWP selection threshold may be added in the ServingCellConfigCommonSIB message of a protocol. By adding the threshold, when multiple BWPs or sub-bands are configured and there are multiple BWPs or sub-bands with RACH resource configuration, the UE may select a BWP or sub-band based on measurement of each BWP or sub-band and the threshold, such that the UE may transmit preamble in a suitable uplink frequency band.

According to a second embodiment, when multiple BWPs or sub-bands are configured to UE, each BWP or sub-band may be configured as RACH resource. When multiple BWPs or sub-bands are configured as RACH resource and RACH procedure is triggered, how to select a BWP or sub-band is proposed in this embodiment. One approach is that BWP or sub-band used for transmitting a RACH message is configured to the UE by RMSI or RRC message. When RACH procedure is triggered, the UE performs preamble transmission in the configured BWP or sub-band. The whole RACH procedure may be completed in the same BWP or sub-band. Other messages during RACH procedure may not be restricted in the BWP or sub-band. The base station may select a suitable BWP or sub-band according to measurement result of each BWP or sub-band, e.g., RSRP, RSRQ, channel occupancy rate, etc.

According to a third embodiment, when multiple BWPs are configured to a UE, each BWP may be configured as RACH resource. When a random access procedure is triggered, the UE may select one SSB based on the SSB measurement results of the selected BWPs or configured BWPs with RACH resource. Then the UE selects preamble and PRACH occasion based on the selected SSB corresponding to one BWP, and calculates preamble received target power based on the configuration of each BWP. After the selecting and calculating, the MAC layer instructs the selected preamble, PRACH occasion, preamble received target power of the corresponding BWP and BWP index to the physical layer.

Multiple LBTs may be performed in these instructed BWPs in the physical layer. Once one LBT succeeds in a certain BWP, the preamble will be transmitted in this BWP. Because RACH configuration is per BWP, different BWPs have different configurations. Therefore, the BWP of the successful LBT can be indicated to the MAC layer, such that it may know configuration parameters of which BWP will be used.

According to a fourth embodiment, during RACH procedure, when RAR reception or contention resolution is not successful, if the preamble transmission counter does not exceed the max preamble transmission number, UE may perform the next random access resource selection procedure. When the selected carrier is not the same as the last carrier which the preamble was transmitted on, or the selected BWP is not the same as the last BWP which the preamble was transmitted on, or the selected sub-band is not the same as the last sub-band which the preamble was transmitted on, the power ramping counter will not be incremented. When carrier, BWP or sub-band changes during RACH procedure for preamble transmission, the power ramping counter will not incremented, which can decrease unnecessary power ramping and reduce the inference on the other nodes or terminals.

According to a fifth embodiment, when preamble is transmitted, the UE starts a time window, e.g. the ra-ResponseWindow configured in RACH-ConfigCommon at the first PDCCH occasion as specified from the end of the Random Access Preamble transmission. However, if the UE does not know which BWP RAR will be transmitted on, it cannot know configuration parameter of which BWP will be used, since RACH resource configuration is per BWP. Therefore, for RAR, UE needs to know which BWP RAR is transmitted on. When Msg 3 is transmitted, the UE will start or restart a timer, e.g. ra-ContentionResolutionTimer. Similar to ra-ResponseWindow, the UE also needs to know which BWP Msg 4 is transmitted on. Otherwise the UE does not know configuration parameter of which BWP will be used. In one example, the base station may do some statistics, e.g. channel occupancy rate. Then it selects BWP based on the channel occupancy rate or RSRP. According to various examples, the statistics herein may not be restricted to channel occupancy rate or RSRP. After BWP is selected, it is transmitted to the UE via RRC message. When the UE receives the configuration, it may use the configuration of this BWP to start RAR window or contention resolution timer, and monitor PDCCH in this configured BWP.

According to a sixth embodiment, when preamble is transmitted, a UE starts a time window, e.g. the ra-ResponseWindow configured in RACH-ConfigCommon at the first PDCCH occasion as specified from the end of the Random Access Preamble transmission. However, if the UE does not know which BWP RAR will be transmitted on, it cannot know configuration parameter of which BWP will be used, since RACH resource configuration is per BWP. Therefore, for RAR, UE needs to know which BWP RAR is transmitted on. When Msg 3 is transmitted, the UE will start or restart a timer, e.g. ra-ContentionResolutionTimer. Similar to ra-ResponseWindow, the UE also needs to know which BWP Msg 4 is transmitted on. Otherwise the UE does not know configuration parameter of which BWP will be used. In one example, the BWP for transmitting Msg 2 and Msg 4 is restricted. For example, the BWP for transmitting Msg 2 is the same as the BWP which the preamble is transmitted on, e.g. DL BWP of transmitting Msg 2 is 1-1 mapping with UL BWP of transmitting the preamble. The BWP for transmitting Msg 3 is the same as the BWP for transmitting Msg 4, e.g. DL BWP of transmitting Msg 4 is 1-1 mapping with UL BWP of transmitting Msg 3. In this case, the UE can know the configuration parameters of which BWP will be used.

According to a seven embodiment, when multiple active BWPs are introduced, the RACH procedure may be performed in any active BWP of the multiple active BWPs. Therefore, which active BWP is to be used may be informed in a handover message. In one example, a BWP index is added in the handover message of a protocol. For example, the BWP index is introduced for SSB resource List. The UE may perform preamble transmission in the configured BWP.

According to an eighth embodiment, when multiple active BWPs are introduced, the RACH procedure may be performed in any active BWP of the multiple active BWPs. For unlicensed spectrum, since the channel status of each BWP is independent, in order to increase the success probability of random access, multiple BWPs may be informed to the UE for a handover procedure. In one example, the RACH resources of multiple BWPs are added in the handover message of a protocol. For example, the BWP index is introduced for CFRA-SSB-Resource of a protocol. When the UE receives the configuration message, it may select a SSB for each indicated BWP. After a SSB is selected, UE may select preamble and PRACH occasion based on the selected SSB in the corresponding BWP.

According to a ninth embodiment, when multiple BWPs or sub-bands are configured to a UE for handover procedure, the UE selects one SSB above a threshold based on the measurement result of SSBs in each BWP or sub-band. If there is one SSB above the threshold, it means that the UE will perform CFRA procedure. If there is no SSB above the threshold, it means UE will perform CBRA procedure. Therefore, there may be a case where some BWPs or sub-bands are used to initiate the CBRA procedure, some BWPs or sub-bands are used to initiate the CFRA procedure. For this case, one proposed approach is that the selected preamble, the PRACH occasion, and the calculated preamble received target power for each BWP or sub-band are indicated to the physical layer. Once one LBT succeeds, the UE transmits the preamble in the BWP or sub-band with the LBT success. Moreover, the physical layer indicates the BWP or sub-band with the LBT success to the MAC layer. When the indication is received, the MAC layer may use the configuration of the BWP or sub-band, and the MAC layer may know which RACH procedure is performed based on the received BWP or sub-band. Other messages of RACH procedure may be transmitted in the same BWP or sub-band. Alternatively, each message of RACH procedure may be transmitted in a different BWP or sub-band.

According to a tenth embodiment, when multiple BWPs or sub-bands are configured to a UE for handover, the UE selects an SSB above a threshold based on the measurement results of SSBs in each BWP or sub-bands. If there is one SSB above the threshold, it means that the UE will perform CFRA procedure. If there is no SSB above the threshold, it means UE will perform CBRA procedure. Therefore, there may be a case where some BWPs or sub-bands are used to initiate the CBRA procedure, some BWPs or sub-bands are used to initiate the CFRA procedure. For this case, one proposed approach is that if there are some BWPs or sub-bands used to initiate the CFRA procedure, the UE will indicate the selected preamble, the PRACH occasion, and the calculated preamble received target power for BWPs or sub-bands initiating CFRA procedure to the physical layer. Once one LBT succeeds, the UE transmits the preamble in the BWP or sub-band with LBT success. Moreover, the physical layer indicates the BWP or sub-band with LBT success to the MAC layer. When the indication is received, the MAC layer may use the configuration of the BWP or sub-band.

If there are no BWP or sub-band initiating CFRA, the UE will indicate the selected preamble, the PRACH resource, and the calculated preamble received target power for each BWP or sub-band to the physical layer. Once one LBT succeeds, the UE transmits the preamble in the BWP or sub-band with LBT success. Moreover, the physical layer indicates the BWP or sub-band with LBT success to the MAC layer. When the indication is received, the UE will use the configuration of the BWP or sub-band. Other messages of RACH procedure may be transmitted in the same BWP or sub-band. Alternatively, each message of RACH procedure may be transmitted in a different BWP or sub-band.

According to an eleventh embodiment, if a UE is configured with multiple sub-bands in a wideband, according to RACH configuration in licensed spectrum, the RACH resource may only be allocated in a certain sub-band. For unlicensed spectrum, in order to increase multiple transmission opportunities, RACH resource may be configured in each sub-band. A proposed approach of RACH resource in sub-band is that common RACH configuration may be configured in each sub-band. Then the PRACH occasions are separate with this approach. The SSB and PRACH occasion mapping is also separate in each sub-band.

The UE may select a SSB separately for each sub-band or all configured sub-bands with RACH resource mainly based on SSB measurement results. Then the UE selects preamble and PRACH occasion separately based on the selected SSB for each sub-band. In addition, the UE calculates preamble received target power for each selected preamble. The preamble, PRACH occasion and preamble received target power may be indicated to the physical layer for each sub-band with RACH resource. The rest of the procedure may be similar to the third embodiment.

According to a twelfth embodiment, if a UE is configured multiple sub-bands in a wideband, according to RACH configuration in licensed spectrum, RACH resource may only be allocated in a certain sub-band. For unlicensed spectrum, in order to increase multiple transmission opportunities, RACH resource may be configured in each sub-band. A proposed approach for RACH resource in sub-band is that at least RACH frequency domain resources may be configured in each sub-band. In other words, some parameters including frequency domain resources are separately configured for each sub-band, and some parameters are common for all sub-bands. PRACH occasions for each sub-band are separate. SSB and PRACH occasion mapping is also separate in each sub-band.

The UE may select a SSB separately for each sub-band or all configured sub-bands with RACH resource mainly based on SSB measurement results. Then the UE selects a preamble and PRACH occasion separately based on the selected SSB for each sub-band. In addition, the UE calculates preamble received target power for each selected preamble. The preamble, PRACH occasion and preamble received target power may be indicated to the physical layer for each sub-band with RACH resource. The rest of the procedure may be similar to the third embodiment.

According to a thirteenth embodiment, if a UE is configured multiple sub-bands in a wideband, and RACH resource in each sub-band is separate. Then the UE may select one sub-band to perform preamble transmission. If multiple UEs select the same preamble and PRACH occasion, it will cause a collision. In order to solve the collision problem, sub-band index is introduced into the RA-RNTI formula.

According to a fourteenth embodiment, if multiple sub-bands are configured to a UE, RACH resource may also be configured in each sub-band. For this case, if PRACH occasion and SSB mapping is separate for each sub-band, it means for the handover procedure, the sub-band index may be indicated to the UE. When the UE receives the RRC reconfiguration message, it may perform preamble transmission in the indicated sub-band.

According to a fifteenth embodiment, if multiple sub-bands are configured to a UE, RACH resource may also be configured in each sub-band. For this case, if PRACH occasion and SSB mapping is separate for each sub-band, it means for a handover, the sub-band index may be indicated to the UE. For unlicensed spectrum, to achieve multiple attempt opportunities, PRACH resources of multiple sub-bands may be indicated to the UE similar to the eighth embodiment.

When the UE receives the configuration message, it selects a SSB based on SSB measurement results and a threshold for each indicated sub-band or the whole wideband. When a SSB is selected, the UE may select preamble and PRACH occasion in the corresponding sub-band. After the selecting, the preamble, PRACH occasion, preamble target received power and sub-band index are all indicated to the physical layer. Multiple LBTs are performed in these indicated sub-bands. Once a LBT succeeds, a sub-band with LBT success will be indicated to the MAC layer, such that the MAC layer may know the configuration of which sub-band to use.

According to a sixteenth embodiment, if multiple sub-bands are configured to a UE, RACH resource may also be configured in each sub-band. For this case, if PRACH occasion and SSB mapping is separate for each sub-band, it means the sub-band index may be indicated to the UE for PDCCH order. For example, a 2-bit sub-band index may be introduced in a spec about PDCCH order in a protocol, e.g. in the DCI format 1_0 for random access procedure initiated by a PDCCH order. When the UE receives PDCCH order, it may perform preamble transmission in the indicated sub-band.

According to a seventeenth embodiment, if multiple sub-bands are configured to a UE, RACH resource may also be configured in each sub-band. For this case, if PRACH occasion and SSB mapping is separate for each sub-band, it means for PDCCH order, the sub-band index may be indicated to UE. In addition, if multiple BWPs are configured to the UE and there are multiple sub-bands in a certain BWP, BWP index may also be indicated to the UE in addition to the sub-band index.

For example, both a 2-bit BWP index and a 2-bit sub-band index may be introduced in a spec about PDCCH order in a protocol, e.g. in the DCI format 1_0 for random access procedure initiated by a PDCCH order. When the UE receives PDCCH order, it may perform preamble transmission in the sub-band of the BWP.

According to an eighteenth embodiment, if multiple sub-bands are configured to a UE, RACH resource may also be configured in each sub-band. For this case, if PRACH occasion and SSB mapping is separate for each sub-band, it means for a beam failure recovery (BFR) procedure, the sub-band index may be indicated to UE. For example, the sub-band index may be added in a BeamFailureRecoveryConfig message of a protocol. When BFR procedure is triggered, it may perform preamble transmission in the indicated sub-band.

According to a nineteenth embodiment, when RACH procedure is triggered, if multiple preamble transmissions are performed, it means that multiple PRACH occasions can be selected. The selection approach of multiple PRACH occasions may include that the UE selects a SSB based on the measurement result of SSBs and a threshold. Once a SSB is selected, the PRACH occasions associated with the SSB may be used as PRACH occasions for transmitting the preamble. If the number of PRACH occasions exceeds a predefined or indicated number N1, the front N1 PRACH occasions may be selected or N1 PRACH occasions may be selected randomly. If the number of PRACH occasions does not reach a predefined or indicated number, the continuous PRACH occasions after the last PRACH occasion associated with the selected SSB may be selected as multiple PRACH occasions for transmitting the preamble.

The transmitted preamble in each PRACH occasion may be the same or different. Once multiple PRACH occasions are selected, and the preamble corresponding to each PRACH occasion is also selected, they may be indicated to the physical layer either together at a same time, or separately before each PRACH occasion.

According to a twentieth embodiment, when RACH procedure is triggered, if multiple preamble transmissions are performed, it means that multiple PRACH occasions can be selected. According to one selection approach of multiple PRACH occasions, PRACH occasions within one PRACH period are grouped. Each SSB is associated with a PRACH occasion group. It means the SSB and PRACH occasion mapping is a one-to-multiple mapping. Once a SSB is selected, PRACH occasions are also selected. The transmitted preamble in each PRACH occasion may be the same or different. When PRACH occasions and preamble corresponding to each PRACH occasion are selected, the UE may indicate them to the physical either all together or separately before each PRACH occasion.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

I claim:

1. A method performed by a wireless communication node, the method comprising:
configuring a plurality of transmission resources for an access of a wireless communication device to the wireless communication node;
receiving, from the wireless communication device on a first transmission resource among the plurality of transmission resources, a first message comprising a preamble for the access to the wireless communication node;
selecting a second transmission resource from the plurality of transmission resources based on at least one of: the first transmission resource according to a predetermined protocol and statistics related to the plurality of transmission resources;
configuring the second transmission resource to the wireless communication device for monitoring a second message; and
transmitting, to the wireless communication device, the second message in response to the first message on the second transmission resource.

2. The method of claim 1, wherein each of the plurality of transmission resources is at least one of: a carrier, a bandwidth part (BWP) and a frequency sub-band.

3. The method of claim 1, wherein the first transmission resource is selected by the wireless communication device from the plurality of transmission resources.

4. The method of claim 1, further comprising:
selecting the first transmission resource from the plurality of transmission resources; and
configuring the first transmission resource to the wireless communication device.

5. The method of claim 1, wherein the first transmission resource is selected from the plurality of transmission resources based on measurement results corresponding to the plurality of transmission resources and a threshold.

6. The method of claim 5, wherein:
the measurement results are related to at least one of: reference signal received power (RSRP), received signal strength indication (RSSI), and channel occupancy rate; and
a measurement result corresponding to the first transmission resource is at least one of:
a sole one of the measurement results that is greater than the threshold,
a random one of multiple measurement results among the measurement results that are greater than the threshold, and
a random one of the measurement results that are not greater than the threshold.

7. The method of claim 1, further comprising:
transmitting, to the wireless communication device, a third message in response to the first message, wherein the third message indicates a failure of the access of the wireless communication device to the wireless communication node; and
receiving, from the wireless communication device on a third transmission resource that is different from the first transmission resource, the first message comprising the preamble for the access to the wireless communication node, wherein the first message is transmitted by the wireless communication device on the first and third transmission resources with a same transmission power.

8. The method of claim 1, further comprising:
receiving, from an additional wireless communication node, an indication indicating at least one transmission resource; and
transmitting the indication to the wireless communication device, wherein one of the at least one transmission resource is to be utilized for an access of the wireless communication device to the additional wireless communication node based on a handover process.

9. The method of claim 1, wherein:
each of the plurality of transmission resources is a frequency sub-band; and
common parameters related to the access to the wireless communication node are configured to the wireless communication device for each frequency sub-band.

10. The method of claim 1, wherein:
each of the plurality of transmission resources is a frequency sub-band;
at least one parameter including a frequency domain resource is configured separately for each frequency sub-band; and
parameters other than the at least one parameter are commonly configured to the wireless communication device for each frequency sub-band.

11. The method of claim 1, wherein:
the first message comprises information related to a radio network temporary identifier (RNTI) for the wireless communication device to identify a response to the first message; and
the RNTI is associated with an indication of the first transmission resource.

12. The method of claim 1, further comprising:
transmitting an indication associated with the first transmission resource to the wireless communication device, wherein the indication indicates at least one of: a bandwidth part (BWP) and a frequency sub-band.

13. The method of claim 1, wherein the access is associated with at least one of:
a handover process;
an uplink synchronization process; and
a beam failure recovery process.

14. A method performed by a wireless communication device, the method comprising:
obtaining, from a wireless communication node, a first transmission resource among a plurality of transmission resources configured for an access of the wireless communication device;
transmitting, to the wireless communication node on the first transmission resource, a first message comprising a preamble for the access to the wireless communication node; and
receiving, from the wireless communication node, a second message in response to the first message on a second transmission resource selected from the plurality of transmission resources based on at least one of: the first transmission resource according to a predetermined protocol and statistics related to the plurality of transmission resources, the second transmission resource configured to the wireless communication device for monitoring the second message.

15. The method of claim 14, wherein each of the plurality of transmission resources is at least one of: a carrier, a bandwidth part (BWP) and a frequency sub-band.

16. The method of claim 14, wherein the first transmission resource is selected by at least one of: the wireless communication node or the wireless communication device.

17. The method of claim 14, wherein the first transmission resource is selected from the plurality of transmission resources based on measurement results corresponding to the plurality of transmission resources and a threshold.

18. The method of claim 14, further comprising:
performing a listen-before-talk (LBT) process on each of the plurality of transmission resources in turn;
determining the first transmission resource in response to a successful LBT on the first transmission resource; and
determining at least one configuration parameter related to the first transmission resource.

19. The method of claim 14, further comprising:
receiving, from the wireless communication node, a third message in response to the first message, wherein the third message indicates a failure of the access of the wireless communication device to the wireless communication node; and
transmitting, to the wireless communication node on a third transmission resource that is different from the first transmission resource, the first message comprising the preamble for the access to the wireless communication node, wherein the first message is transmitted on the first and third transmission resources with a same transmission power.

* * * * *